(12) United States Patent
Araujo

(10) Patent No.: US 6,450,156 B1
(45) Date of Patent: Sep. 17, 2002

(54) TURBINE SUPERCHARGER FOR AN INTERNAL COMBUSTION ENGINE

(76) Inventor: Albert F. Araujo, 3350 SW. 139th Ave., Miramar, FL (US) 33027

( * ) Notice: Subject to any disclaimer, the term of this patent is extended or adjusted under 35 U.S.C. 154(b) by 0 days.

(21) Appl. No.: 09/804,452

(22) Filed: Mar. 12, 2001

Related U.S. Application Data

(63) Continuation-in-part of application No. 09/661,733, filed on Sep. 14, 2000.

(51) Int. Cl.⁷ .............................................. F02B 33/00
(52) U.S. Cl. .......................... 123/565; 60/606; 60/607; 60/609; 415/121; 415/168
(58) Field of Search .......................... 60/606, 607, 609; 123/565; 415/121, 168

(56) References Cited

U.S. PATENT DOCUMENTS

| 2,165,360 | A |   | 1/1939  | Elliott                |
|-----------|---|---|---------|------------------------|
| 2,439,817 | A |   | 4/1948  | Mercier                |
| 2,583,882 | A |   | 1/1952  | Ricardo                |
| 2,594,686 | A |   | 4/1952  | Sammons                |
| 2,633,698 | A | * | 4/1953  | Nettel ........... 60/606 |
| 3,163,984 | A | * | 1/1965  | Dumont ......... 60/606 |
| 3,355,877 | A | * | 12/1967 | Chaffiotte ...... 60/606 |
| 3,570,240 | A | * | 3/1971  | Melchior ........ 60/606 |
| 3,676,999 | A | * | 7/1972  | Oldfield ......... 60/606 |
| 3,949,555 | A | * | 4/1976  | Melchior ........ 60/606 |
| 3,988,894 | A | * | 11/1976 | Melchior ........ 60/606 |
| 4,449,370 | A | * | 5/1984  | Ream ............ 60/606 |
| 4,610,235 | A |   | 9/1986  | Grunig                 |
| 4,724,817 | A |   | 2/1988  | Cook                   |
| 4,815,931 | A | * | 3/1989  | Linck et al. .... 415/121 |
| 4,936,097 | A |   | 6/1990  | Rodgers ......... 60/606 |
| 5,421,310 | A |   | 6/1995  | Kapich                 |
| 5,456,240 | A |   | 10/1995 | Kanesaka               |
| 5,577,385 | A |   | 11/1996 | Kapich                 |
| 5,586,540 | A |   | 12/1996 | Marzec et al.          |
| 5,638,796 | A |   | 6/1997  | Adams, III et al.      |
| 5,653,108 | A | * | 8/1997  | Hope ............ 60/606 |
| 5,904,045 | A |   | 5/1999  | Kapich                 |
| 5,924,286 | A |   | 7/1999  | Kapich                 |
| 5,927,075 | A |   | 7/1999  | Khair                  |
| 6,029,452 | A |   | 2/2000  | Halimi et al.          |

FOREIGN PATENT DOCUMENTS

GB       2147356 A       9/1985

OTHER PUBLICATIONS

"R.A. Microjets RAM Turbines Specs", 2 pages, downloaded from wwww.ramicrojets.com.

* cited by examiner

Primary Examiner—Thomas Denion
Assistant Examiner—Thai-Ba Trieu
(74) Attorney, Agent, or Firm—David P. Gordon; David S. Jacobson; Thomas A Gallagher

(57) ABSTRACT

An air compressor for charging an internal combustion engine includes a compressor for blowing compressed air into the intake manifold of the engine and a gas powered turbine for driving the compressor. In a first embodiment, the exhaust from a small gas powered turbine is coupled to the driving turbine of a standard turbocharger. In a second embodiment, the drive shaft of a small gas powered turbine is coupled to the drive shaft of a standard supercharger. In a third embodiment, a compressor turbine having an air intake, a compressed air outlet, and a bleed air outlet is coupled to a small gas powered turbine such that the bleed air outlet supplies the combustor intake of the gas turbine. The gas powered turbine drives the compressor and receives compressed air from the compressor via the bleed outlet. The system provides a constant boost, does not use engine horsepower, is easy to install, and does not need to be coupled to a rotating shaft or the exhaust system of the engine.

28 Claims, 7 Drawing Sheets

TURBINE SUPERCHARGER FOR AN INTERNAL COMBUSTION ENGINE

This is a continuation-in-part of U.S. Ser. No. 09/661,733 filed Sep. 14, 2000.

BACKGROUND OF THE INVENTION

1. Field of the Invention

This invention relates to air compressors otherwise known as turbochargers and superchargers for forcing air into the air intake of an internal combustion engine. More particularly, this invention relates to a compressor of this type which is independently powered by a turbine engine. This invention has particular application for automobiles, but is not limited thereto, and may be used in other applications.

2. State of the Art

It is well known in the art of internal combustion engines to provide an air compressor at the air intake of the engine so that air entering the intake is first compressed and the power output of the engine is thereby increased. These air compressors are typically engaged only temporarily when it is desirable to boost the engine's output, for example when accelerating an automobile. There are two basic types of air compressors: turbochargers and superchargers.

Turbochargers are powered by the exhaust gases of an engine. They generally include a turbine and a compressor which are coupled to each other by a shaft. The turbine is driven by the exhaust gases of the engine. The rotation of the turbine causes the compressor to rotate. The compressor compresses air entering the intake manifold of the internal combustion engine.

Superchargers include a compressor which is gear driven or belt driven by a rotating shaft of the internal combustion engine. The rotation of the compressor compresses air entering the intake manifold of the internal combustion engine.

Both turbochargers and superchargers achieve the same purpose. They both boost the air pressure in the intake manifold of the internal combustion engine. This results in an increase in the power output of the engine. However, both turbochargers and superchargers have disadvantages.

One of the disadvantages of turbochargers is referred to as "turbo lag". When the turbo charger is engaged, it takes four to five seconds before sufficient exhaust pressure is built up to spin the turbine blades fast enough to provide a power boost. Another disadvantage of turbochargers is that they can interfere with the engine's exhaust system. This has an adverse effect on the engine's performance.

Superchargers do not have the lag experienced by turbochargers. However, they require a substantial amount of engine horsepower to be driven. Where turbochargers and superchargers derive power from the engine, they also require relatively complex couplings to the engine.

In order to avoid taxing the engine with the supercharger, it is known to provide an independently powered supercharger for compressing air. These independently powered superchargers have taken the form of a conventional piston engine, a rotary engine, an electric motor, and a hydraulic motor, and are described in, e.g., U.S. Pat. No. 2,165,360 to Elliott, U.S. Pat. No. 4,610,235 to Grunig, U.S. Pat. No. 5,456,240 to Kanesaka, and U.S. Pat. No. 5,577,385 to Kapich, all of which are hereby incorporated by reference herein in their entireties.

Typically, for most commercial vehicles, the horsepower (HP) required to operate a supercharger compressor varies from 40HP–150HP (at 90,000 to 140,000 rotations per minute (RPM)). In order to produce 40HP–150HP at 90,000 to 140,000 RPM from an independent engine, using the systems of the prior art, a relatively large independent engine with a complex gear mechanism is required. For example, a conventional piston engine or rotary engine capable of producing the desired horsepower and RPM will weigh well in excess of one hundred pounds. Similarly, an electric motor engine which produces the required horsepower and RPM will typically weigh between 100 and 500 pounds and will require a substantial power source to operate. A hydraulic motor will require a large pump and will have difficulty producing the high RPM required. In all cases, the independent supercharger of the prior art adds considerable weight to the system, and requires a substantial area (typically a minimum of 4 cubic feet) for installation. Thus, these independently powered supercharger systems have not found wide-spread utilization in the auto industry.

SUMMARY OF THE INVENTION

It is therefore an object of the invention to provide an air compressor for charging an internal combustion engine.

It is also an object of the invention to provide an air compressor for charging an internal combustion engine which does not draw power from the engine.

It is another object of the invention to provide an air compressor for charging an internal combustion engine which does not have a lag time when engaged.

It is a further object of the invention to provide an air compressor for charging an internal combustion engine which does not restrict the exhaust system of the engine.

Another object of the invention is to provide an air compressor for charging an internal combustion engine which is simple to install, which is light in weight, and which does not require substantial area for installation.

In accord with these objects which will be discussed in detail below, the air compressor of the present invention includes a first turbine (also referred to as "the compressor") for blowing compressed air into the intake manifold of an internal combustion engine and a second, fuel powered, turbine (also referred to as "the turbine") for driving the compressor. According to a first embodiment, the exhaust from a small gas powered turbine is coupled to the driving turbine of a standard turbocharger. The turbocharger operates in a normal manner except that it can operate at a constant boost, does not use engine horsepower, is easier to install, and does not interfere with engine exhaust. According to a second embodiment, the drive shaft of a small gas powered turbine is coupled to the drive shaft of a standard supercharger or turbocharger compressor. The supercharger operates in a normal manner except that it can operate at a constant boost, does not use engine horsepower, is easier to install, and does not need to be coupled to a rotating shaft of the engine. According to a third embodiment, a small gas powered turbine drives a compressor which supplies compressed air to the intake manifold of the engine being charged as well as supplying compressed air to the combustion chamber of the small gas powered turbine. The gas powered turbine rotates the compressor to drive it and provides compressed air to both the intake manifold of the internal combustion engine and to the combustion chamber of the small gas turbine. The compressed air outlet of the compressor can provide a constant boost, does not use engine horsepower, is easy to install, and does not need to be coupled to a rotating shaft or the exhaust system of the engine.

According to the invention, the gas powered turbine may be single stage or multi-stage. Both the gas powered turbine and the compressor can be axial flow, radial flow, centrifugal, or any combination thereof. Various types of combustors can be utilized including annular and can annular combustors. The combustor may be positioned between the compressor and turbine, at a remote location, or may be arranged in a standard reverse-flow arrangement. The essence of the invention is to provide a self-powered turbine for driving the compressor. As used herein, self-powered means that the turbine does not derive power from the internal combustion engine into the intake manifold of which it is blowing compressed air.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
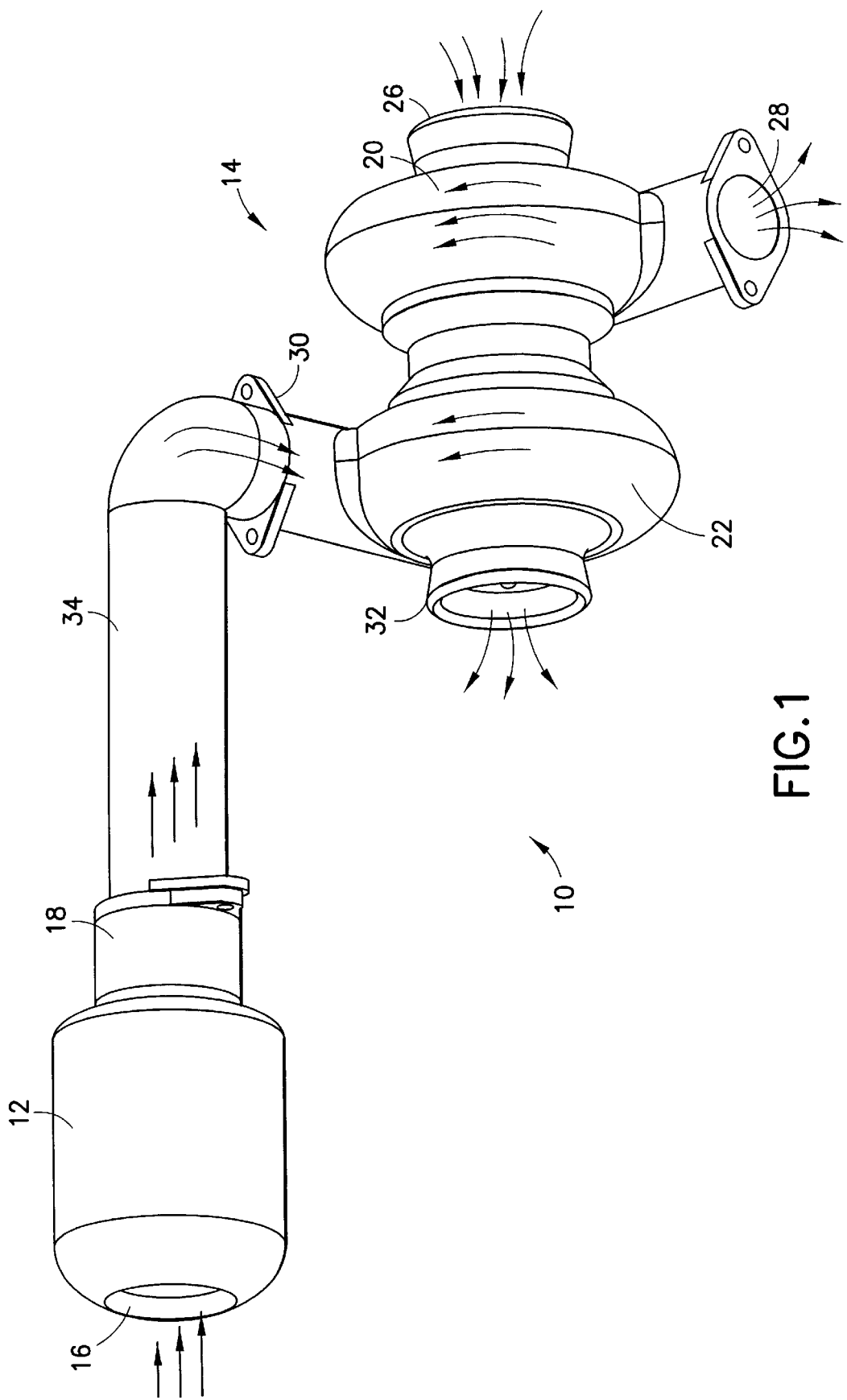
FIG. 1 is a perspective view of a first embodiment of the invention.
Figure 1A:
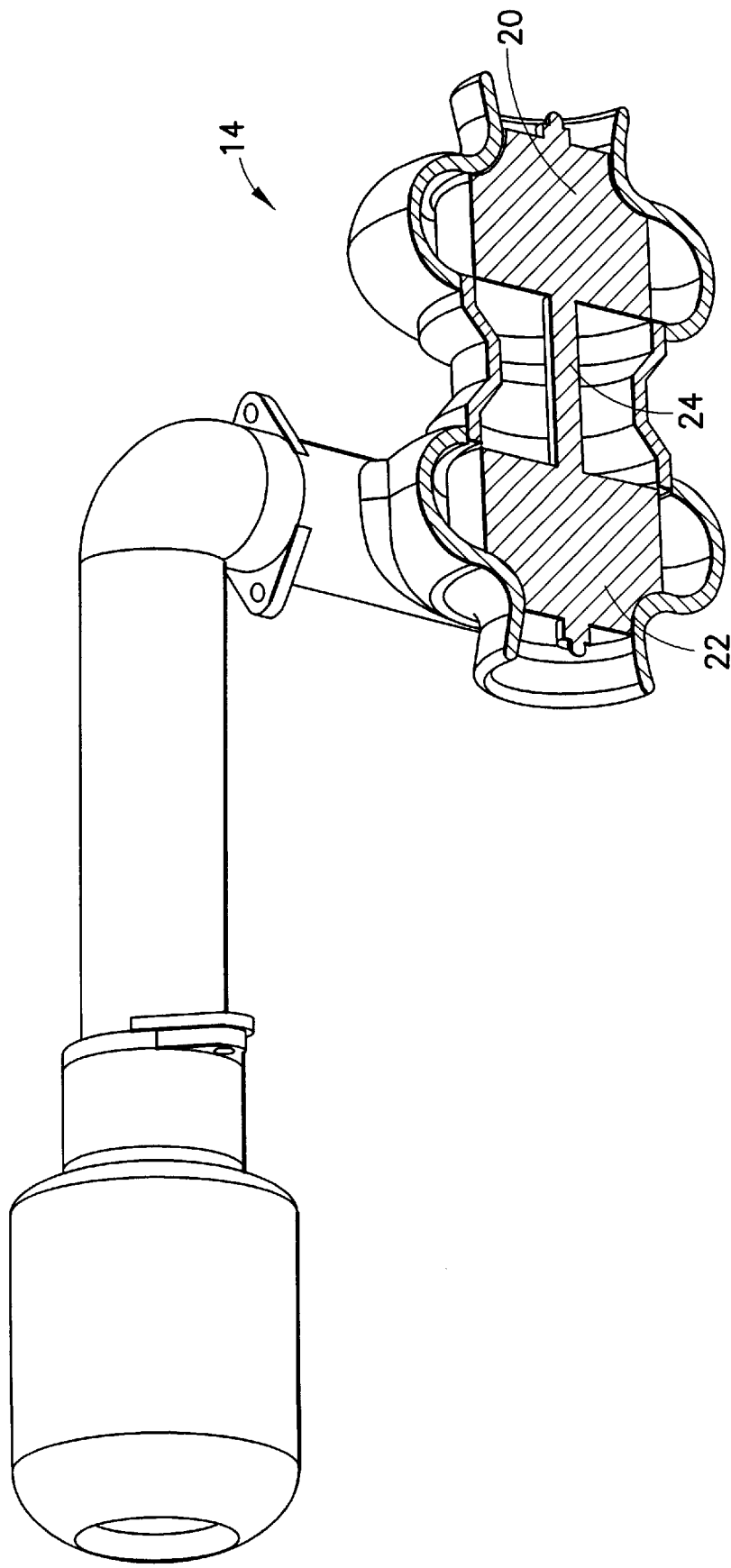
FIG. 1A is a cut away perspective view of the first embodiment of the invention.

Referring now to FIGS. 1 and 1A, a first embodiment 10 of the invention includes a small gas powered turbine 12 (also called the "self-powered driving turbine") coupled to a standard turbocharger 14. The self-powered driving turbine 12 has an air inlet 16 and an exhaust 18. The turbocharger 14 has a compressor 20 and a driving turbine 22 coupled to each other by a drive shaft 24. The compressor 20 has an air inlet 26 and a compressed air outlet 28 which is adapted to be coupled to the intake manifold of an internal combustion engine (not shown). The driving turbine 22 of the turbocharger has an inlet 30 and an outlet 32. According to the invention, the exhaust 18 of the turbine 12 is coupled to the inlet 30 of the turbine of the turbocharger 22 (which is otherwise typically adapted to be coupled to the exhaust system of the internal combustion engine) via a conduit 34. As shown by the flow arrows in FIG. 1, air enters the self-powered driving turbine 12 through inlet 16. The self-powered driving turbine 12 mixes fuel with the air and combusts it resulting in a high velocity exhaust jet exiting at exhaust 18. The high velocity exhaust travels through the conduit 34 and enters the inlet 30 of the driving turbine 22. The exhaust causes the turbine to spin and exits through the outlet 32. The spinning of turbine 22 is translated to the compressor 20 via the drive shaft 24. This causes the compressor 20 to rotate, drawing air into the inlet 26 and ejecting compressed air via the outlet 28. The turbocharger 14 thereby operates in a normal manner except that it can operate at a constant boost and does not use engine horsepower. Since the turbocharger of the invention is not coupled to the exhaust system of the engine, it is easier to install, and does not interfere with engine exhaust. The first embodiment of the invention is preferably implemented using a standard turbocharger such as those sold by Garrett, Torrance, Calif. or Turbonetics, Moorpark, Calif. and a miniature gas turbine such as the RAM-1000 gas turbine available from R. A. Microjets, Miami, Fla. The RAM-1000 weighs slightly over two pounds, has a diameter of approximately 4.25", and has a length just under ten inches. In general, according to the invention, the driving turbine preferably should have a diameter no greater than 12" and a length no greater than 14" so that it is easily accommodated in the engine compartment of the internal combustion engine and thereby easily retrofitted to the internal combustion engine. In addition, preferably, the driving turbine should weigh no more than ten pounds so that it does not add considerable weight to the system.

Figure 2:
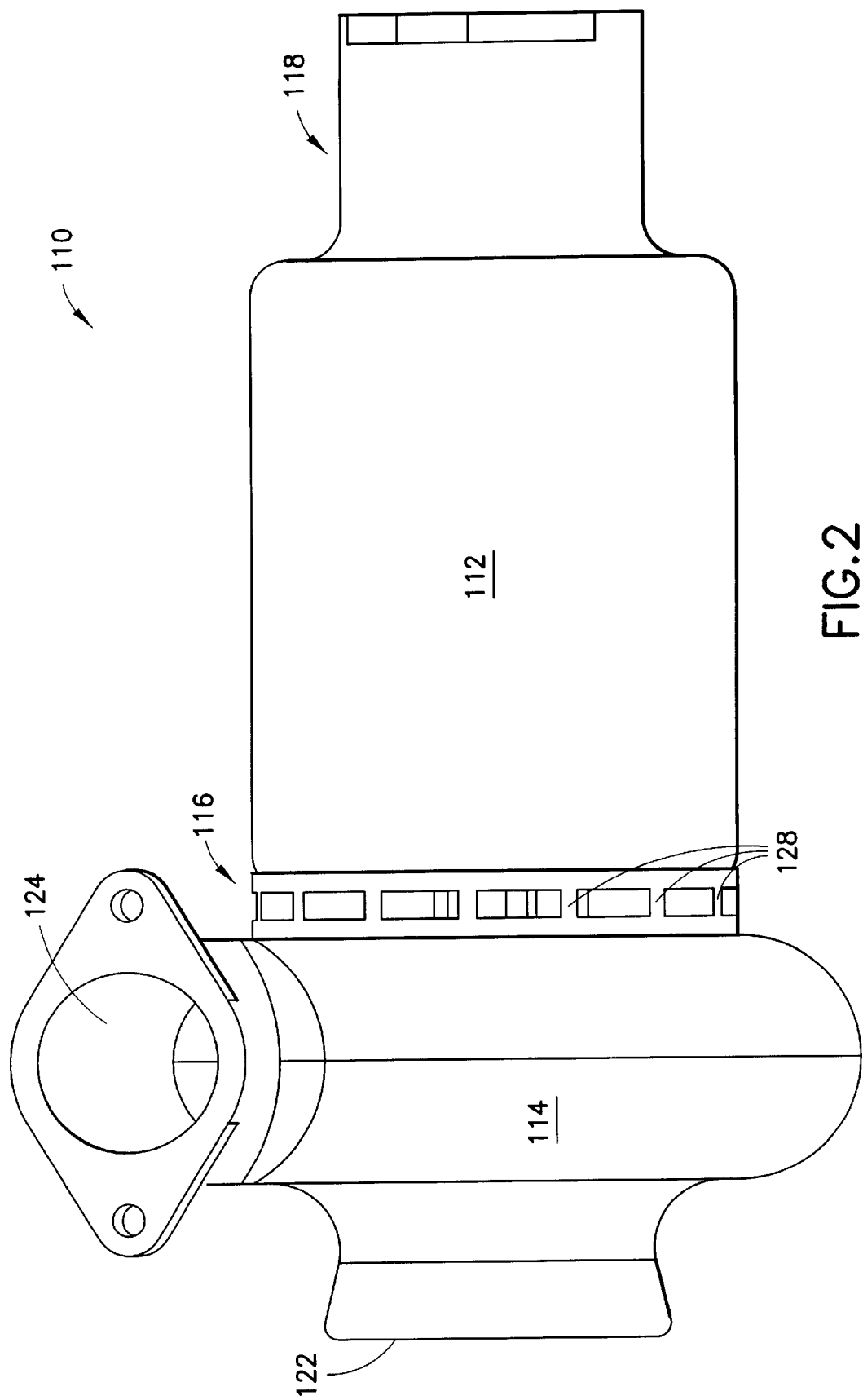
FIG. 2 is a perspective view of a second embodiment of the invention.
Figure 2A:
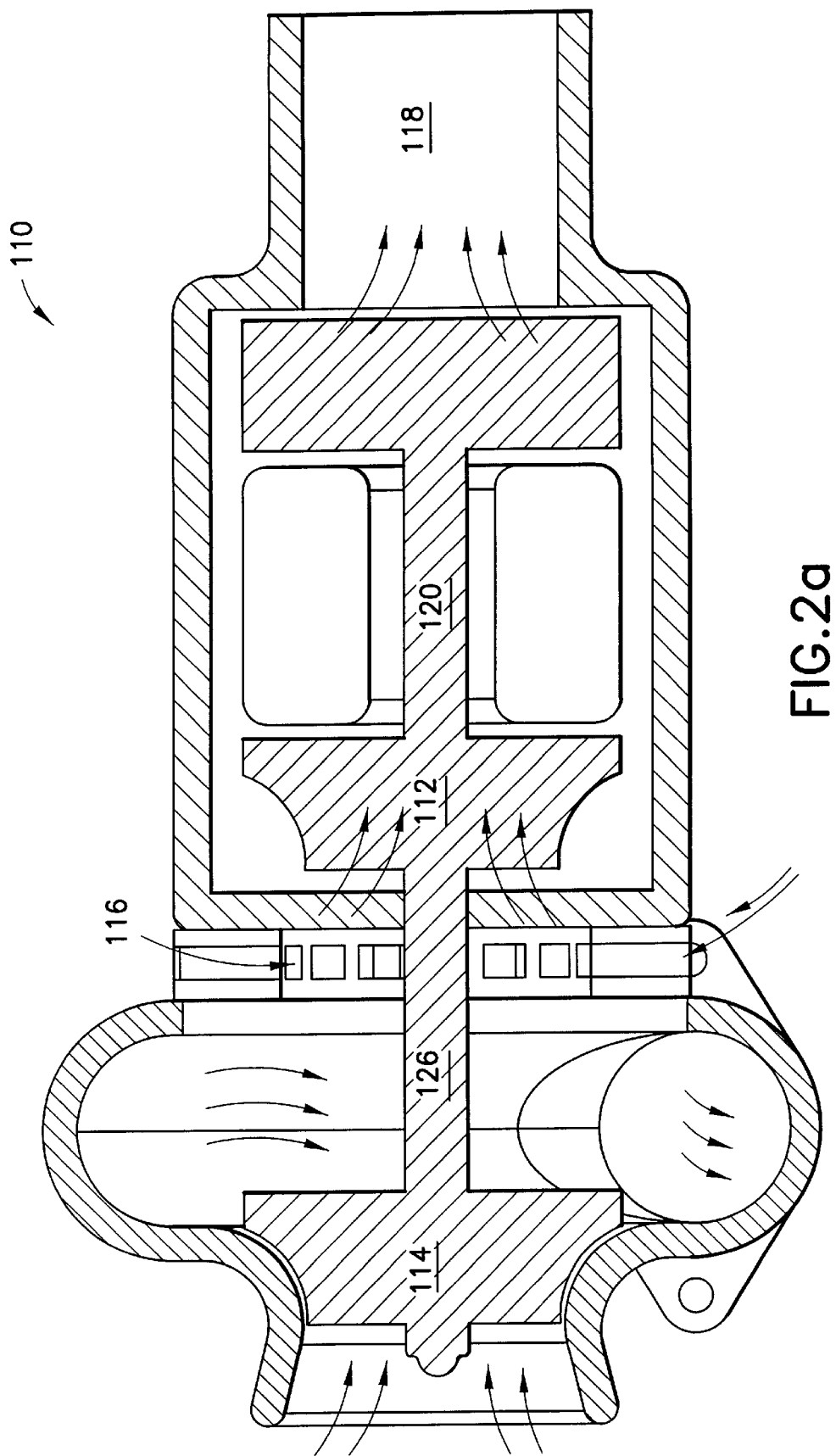
FIG. 2A is a cut away perspective view of the second embodiment of the invention.

Turning now to FIGS. 2 and 2A, a second embodiment 110 of the invention includes a self-powered driving turbine 112 and a standard supercharger 114. The self-powered driving turbine has an inlet 116, an exhaust 118, and a drive shaft 120. The supercharger 114 has an inlet 122, a compressed air outlet 124, and a drive shaft 126. The self-powered turbine 112 is coupled to the supercharger 114 by a plurality of spaced apart supports 128. The respective drive shafts 120 and 126 are coupled to each other by a bearing housing (not shown). As shown by the flow arrows in FIG. 2A, air enters the self-powered driving turbine 112 through the inlet 116. The self-powered driving turbine 112 mixes fuel with the air and combusts it resulting in a high velocity exhaust. The exhaust spins the turbine and exits via the exhaust 118. This causes the drive shaft 120 to spin, which, in turn causes the drive shaft 126 to spin. The drive shaft 126 powers the supercharger 114 which takes air in at 122 and blows compressed air out at 124. The supercharger 114 thereby operates in a normal manner except that it can operate at a constant boost and does not use engine horsepower. It is easier to install because it does not need to be coupled to a rotating shaft of the engine or to the engine's exhaust system. The second embodiment of the invention can be implemented using, e.g., the RAM-1000TC gas turbine from R. A. Microjets, Miami, Fla. as the self-powered driving turbine 112.

Figure 3:
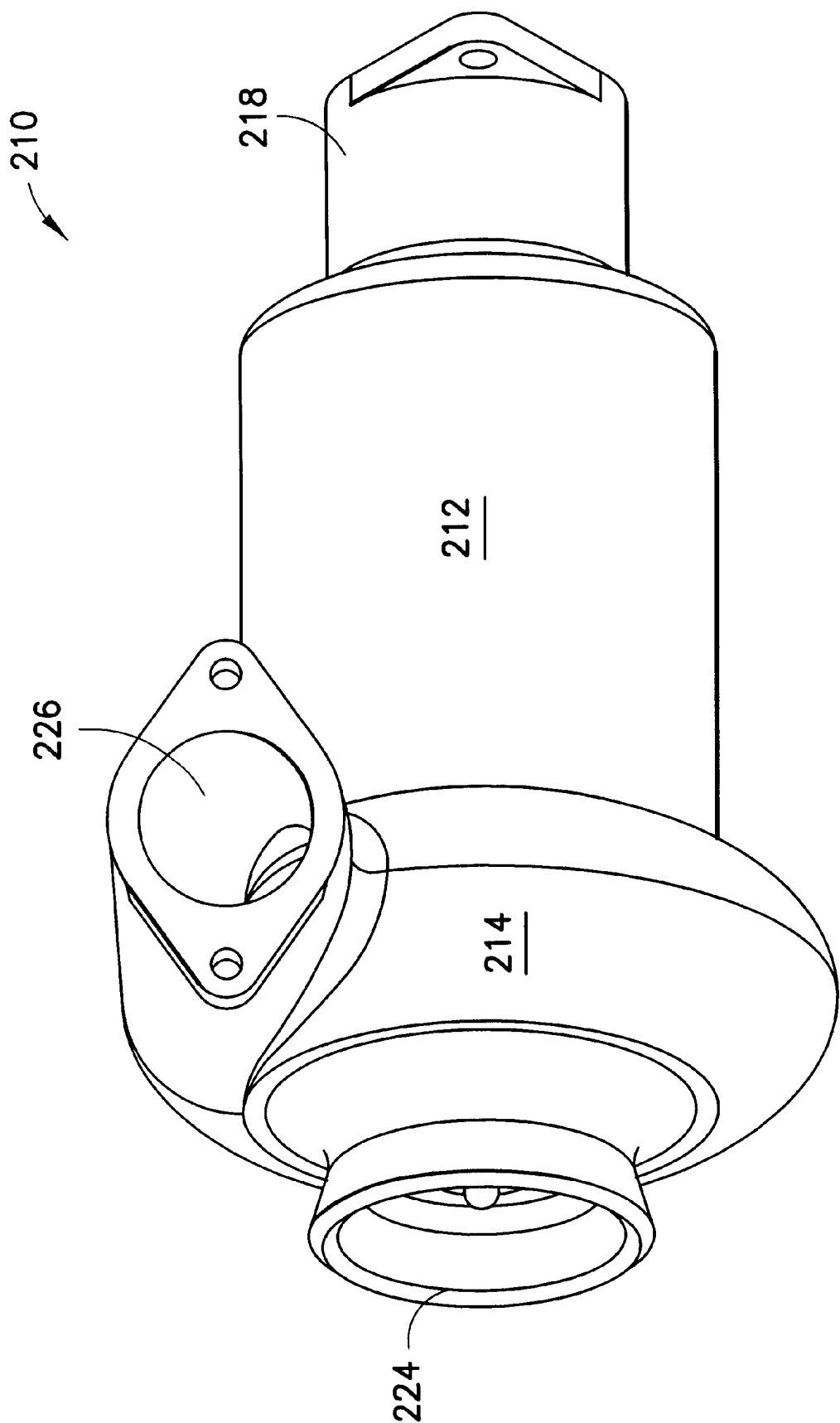
FIG. 3 is a perspective view of a third embodiment of the invention.
Figure 3A:
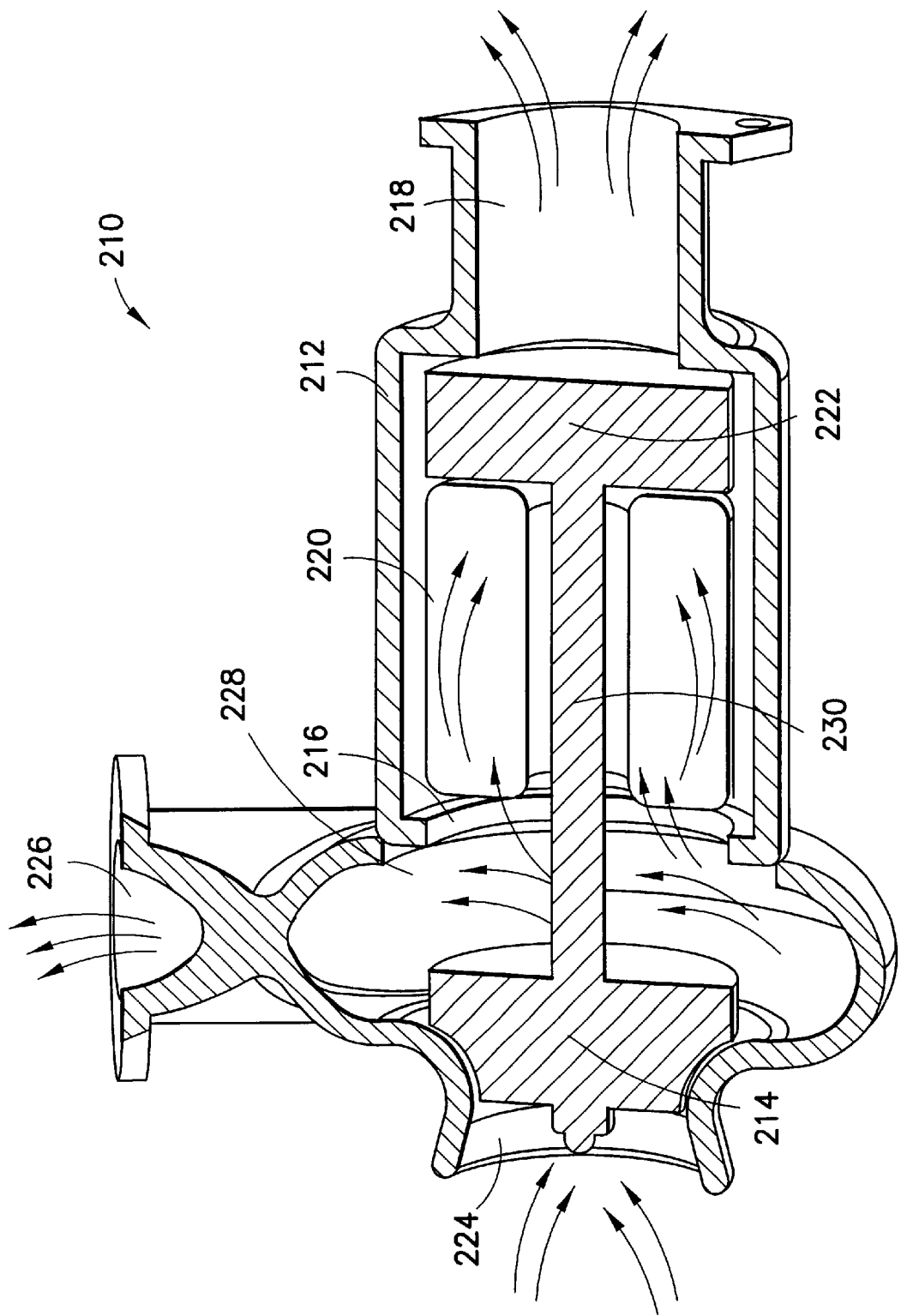
FIG. 3A is a cut away perspective view of the third embodiment of the invention.

Referring now to FIGS. 3 and 3A, the third embodiment 210 includes a self-powered driving turbine 212 and a compressor 214. The self-powered driving turbine 212 has an inlet 216, an outlet 218, a combustor 220 and a turbine fan 222. The compressor 214 has an inlet 224, a compressed air outlet 226, and a bleed outlet 228. The compressed air outlet 226 is adapted to be coupled to the intake manifold of an internal combustion engine. The inlet 216 of the self-powered drive turbine 112 is coupled to the bleed outlet 228 of the compressor 214. As shown by the flow arrows in FIG. 3A, air enters the inlet 224 and is compressed by the compressor 214. A portion of that air exits through the bleed outlet 228 and into the inlet 216 of the self-powered drive turbine 212. The self-powered drive turbine 212 adds fuel to the bleed air, combusts it in the combustor 220, and propels it through the turbine 222 (which is coupled to the compressor 214 by a shaft 230) to the exhaust 218. The operation of the self-powered drive turbine 212 causes air to be sucked into the inlet 224 by the compressor 214. A portion of the air entering the compressor is compressed and blown (via bleed outlet 228) into the self-powered drive turbine 212. Another portion is compressed and blown out the outlet 226. The compressed air outlet of the compressor turbine can provide a constant boost, does not use engine horsepower, and is easy to install because it does not need to be coupled to a rotating shaft or the exhaust system of the engine.

Figure 4:
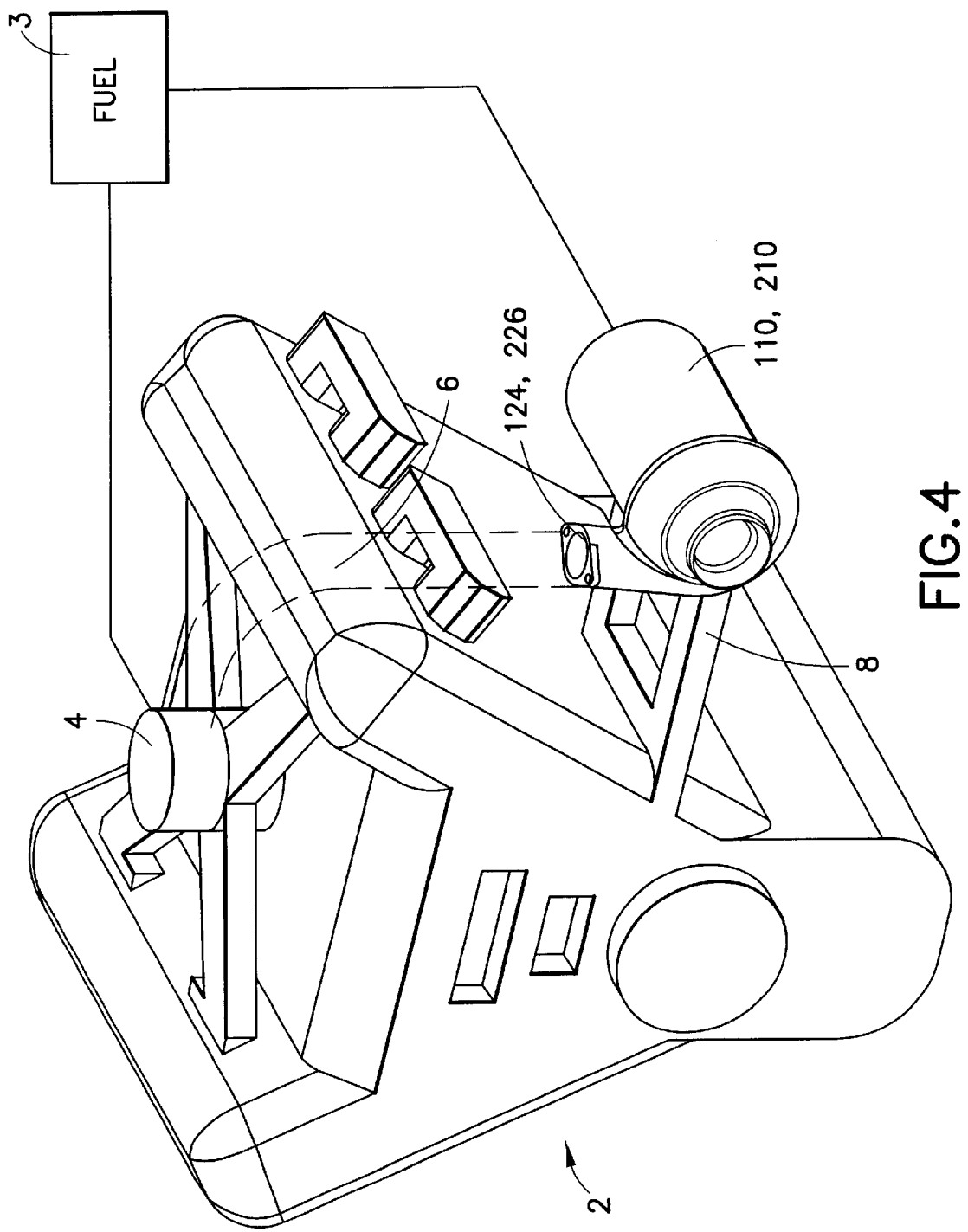
FIG. 4 is a simplified perspective view illustrating how the invention is used in conjunction with an internal combustion engine.

Referring now to FIG. 4, any one of the embodiments described above can be used with an internal combustion engine 2 having an intake manifold 4. As shown in FIG. 4, the compressor outlet 124, 226 of the second or third embodiment 110, 210 is coupled to the intake manifold 4 by a conduit 6 (shown in phantom). The conduit may be flexible or rigid depending on where the compressor is mounted. In the example shown in FIG. 4, the compressor is mounted to the engine block by a bracket 8. Since there will be no relative movement between the compressor and the engine, the conduit may be rigid. If the compressor is mounted to the engine compartment, a flexible conduit is preferably used. As mentioned above, the turbine and the internal combustion engine can share the same fuel supply. This is illustrated Schematically in FIG. 4 wherein fuel supply 3 is coupled to both engines.

There have been described and illustrated herein several embodiments of an air compressor for charging an internal combustion engine. While particular embodiments of the invention have been described, it is not intended that the invention be limited thereto, as it is intended that the invention be as broad in scope as the art will allow and that the specification be read likewise. Thus, while a single stage driving turbine was disclosed, according to the invention, the driving turbine may be single stage or multi-stage. In addition, both the driving turbine and the compressor turbine can be axial flow, radial flow, centrifugal, or any combination thereof. Further, various types of combustors can be utilized including annular and can annular combustors. The combustor may be positioned between the compressor and turbine, at a remote location, or may be arranged in a reverse-flow arrangement behind the turbine. Also, different types of fuels can be utilized, including, but not limited to gasoline, propane, diesel oil, kerosene, hydrogen, etc. The fuel for the self-powered driving turbine is preferably tapped from the fuel line of the engine being charged, although a separate fuel source can be utilized. Further yet, it will be appreciated that while the system was described as being particularly useful for automobile engines, the system can be utilized in conjunction with boat engines, airplane engines, etc. It will therefore be appreciated by those skilled in the art that yet other modifications could be made to the provided invention without deviating from its spirit and scope as so claimed.

What is claimed is:

1. An apparatus for blowing air into the intake manifold of an internal combustion engine, comprising:
   a) a compressor having an air inlet and a compressed air outlet, said compressed air outlet being adapted to be coupled to the intake manifold of the internal combustion engine; and
   b) a self-powered driving turbine engine coupled to said compressor such that said compressor is driven without using any power from the internal combustion engine, wherein
   said driving turbine has no coupling for drivingly coupling to the internal combustion engine and said driving turbine has no gas coupling for receiving exhaust gas from the internal combustion engine.

2. The apparatus according to claim 1, wherein:
said compressor is a turbocharger having a second driving turbine with a second driving turbine air inlet, and
said self-powered driving turbine engine has an exhaust outlet coupled to the second driving turbine air inlet.

3. The apparatus according to claim 1, wherein:
said compressor is a supercharger having a first drive shaft, and
said self-powered driving turbine engine has a second drive shaft coupled to said first drive shaft of the supercharger.

4. The apparatus according to claim 1, wherein:
said compressor has a bleed outlet, and
said self-powered driving turbine engine has a turbine engine air inlet coupled to said bleed outlet.

5. The apparatus according to claim 4, wherein:
said compressor has a drive shaft and said self-powered driving turbine engine has a turbine drive shaft coupled to the drive shaft of the compressor.

6. The apparatus according to claim 1, wherein:
said self-powered driving turbine engine is a gas turbine weighing less than ten pounds.

7. The apparatus according to claim 1, wherein:
said self-powered driving turbine engine has a diameter less than approximately twelve inches.

8. The apparatus according to claim 1, wherein:
said self-powered driving turbine engine is a single stage turbine.

9. The apparatus according to claim 1, wherein:
said self-powered driving turbine engine is one of an axial flow turbine, a radial flow turbine, and a centrifugal flow turbine.

10. An engine apparatus, comprising:
a) an internal combustion engine having an intake manifold;
b) a compressor having an air inlet and a compressed air outlet, said compressed air outlet being coupled to said intake manifold of said internal combustion engine; and
c) a self-powered driving turbine engine coupled to said compressor such that said compressor is driven without using any power from said internal combustion engine, wherein
said driving turbine is not drivingly coupled to said internal combustion engine and said driving turbine does not receive exhaust gas from said internal combustion engine.

11. The apparatus according to claim 10, wherein:
said compressor is a turbocharger having a second driving turbine with a driving turbine air inlet, and
said self-powered driving turbine engine has an exhaust outlet coupled to said driving turbine air inlet of said second driving turbine.

12. The apparatus according to claim 10, wherein:
said compressor is a supercharger having a first drive shaft, and
said self-driving turbine engine has a second drive shaft coupled to said first drive shaft.

13. The apparatus according to claim 10, wherein:
said compressor has a bleed outlet, and
said self-driving turbine engine has a turbine engine air inlet coupled to said bleed outlet.

14. The apparatus according to claim 13, wherein:
said compressor has a first drive shaft and said self-driving turbine engine has a second drive shaft coupled to said first drive shaft.

15. The apparatus according to claim 10, wherein:
said self-powered driving turbine engine is a gas turbine weighing less than ten pounds.

16. The apparatus according to claim 10, wherein:

said self-powered driving turbine engine is a turbine having a diameter less than approximately twelve inches.

17. The apparatus according to claim 10, wherein:

said self-powered driving turbine engine is a single stage turbine.

18. The apparatus according to claim 10, wherein:

said self-powered driving turbine engine is one of an axial flow turbine, a radial flow turbine, and a centrifugal flow turbine.

19. The apparatus according to claim 10, further comprising:

d) a single fuel supply shared by both said internal combustion engine and said self-powered driving turbine engine.

20. In a vehicle powered by an internal combustion engine having an intake manifold, the improvement comprising:

a) a compressor having an air inlet and a compressed air outlet, said compressed air outlet being coupled to the intake manifold of the internal combustion engine; and b) a self-powered driving turbine engine coupled to said compressor such that said compressor is driven without using any power from the internal combustion engine, wherein said driving turbine is not drivingly coupled to the internal combustion engine and said driving turbine does not receive exhaust gas from the internal combustion engine.

21. The improvement according to claim 20, wherein:

said compressor is a turbocharger having a second driving turbine with a driving turbine air inlet, and said self-powered driving turbine engine has an exhaust outlet coupled to said driving turbine air inlet.

22. The improvement according to claim 20, wherein:

said compressor is a supercharger having a first drive shaft, and said self-driving turbine engine has a second drive shaft coupled to said first drive shaft.

23. The improvement according to claim 20, wherein:

said compressor has a bleed outlet, and said self-driving turbine engine has a turbine engine air inlet coupled to said bleed outlet.

24. The improvement according to claim 23, wherein:

said compressor has a first drive shaft and said self-driving turbine engine has a second drive shaft coupled to said first drive shaft.

25. The improvement according to claim 20, wherein:

said self-driving turbine engine is a gas turbine.

26. The improvement according to claim 20, wherein:

said self-driving turbine engine is a turbine having a diameter less than approximately twelve inches.

27. The improvement according to claim 20, wherein:

said self-driving turbine engine is a single stage turbine.

28. The improvement according to claim 20, wherein:

said self-driving turbine engine is one of an axial flow turbine, a radial flow turbine, and a centrifugal flow turbine.

* * * * *